United States Patent
Tong et al.

(10) Patent No.: US 6,311,070 B1
(45) Date of Patent: Oct. 30, 2001

(54) VARIABLE STEP SIZE FOR POWER CONTROL BITS TO PROTECT AGAINST POWER OVERSHOOT

(75) Inventors: Wen Tong; Rui R. Wang, both of Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/273,411

(22) Filed: Mar. 22, 1999

(51) Int. Cl.[7] .................. H04B 7/00; H04B 7/20
(52) U.S. Cl. ............ 455/522; 455/13.4; 455/38.3; 370/318
(58) Field of Search .................. 455/522, 13.4, 455/38.3, 67.1; 370/318, 320, 335

(56) References Cited

U.S. PATENT DOCUMENTS

| | | | |
|---|---|---|---|
| 5,982,760 | * 11/1999 | Chen | 370/335 |
| 6,034,952 | * 3/2000 | Dohi et al. | 370/335 |
| 6,081,727 | * 6/2000 | Kondo | 455/522 |
| 6,128,506 | * 10/2000 | Knutsson et al. | 455/522 |
| 6,151,508 | * 11/2000 | Kim et al. | 455/522 |

\* cited by examiner

*Primary Examiner*—Dwayne Bost
*Assistant Examiner*—Temica M. Davis
(74) *Attorney, Agent, or Firm*—Dennis R. Haszko; Cobrin & Gittes

(57) ABSTRACT

The invention provides a system and method for controlling transmission power of a mobile unit in a wireless communication system which minimizes transmission power overshoot caused by counteracting the effects of deep fading. The power control bits are received by the mobile unit then examined on an individual basis and also as a block of bits. Initially, each time a request to increase power is received the mobile unit increases the transmission power by 1 dB. When the mobile unit determines that a predetermined number of bits in a block each indicates a request to increase power is received the mobile unit increases the transmission power by 2 dB. After the block of increase requests, if the mobile receives a request to decrease the transmission power it increases the transmission power by 2 dB, then decreases the transmission power for the next two power control periods by 3 dB each.

17 Claims, 3 Drawing Sheets

VARIABLE STEP SIZE FOR POWER CONTROL BITS TO PROTECT AGAINST POWER OVERSHOOT

FIELD OF THE INVENTION

This invention relates generally to the field of wireless communications systems and more particularly to a varying the step size of power control bits (PCBs) to protect against transmit power overshoot in Code Division Multiple Access (CDMA) communications systems.

BACKGROUND OF THE INVENTION

In CDMA communications systems, maximum uplink capacity is achieved when the power level of signals received by the Base Transceiver Subsystem (BTS) is the same for all mobile users. Such a power level is called the "nominal power level." If this nominal power level is maintained regardless of the distance between the base station and the mobile unit and regardless of the signal propagation environment then maximum uplink capacity is maintained.

If the power level of a signal received from a mobile unit drops below the nominal level, the error probability for that user increases. If the power level of a signal received from a mobile unit exceeds the nominal level, the probability that the signal will interfere with signals from other mobile units increases. Thus transmission power deviations from the nominal power level decrease the capacity of the system.

Rayleigh fading is a problem which introduces a fast power deviation from the nominal power level and thus degrades system capacity.

In current Third Generation Partner Project (3GPP) systems, power control mechanisms are being employed which attempt to equalize the received power of the signal from the mobile unit and to compensate for fast power deviations from the nominal power level caused by the impact of Rayleigh fading.

The overall uplink power control for 3GPP is shown in FIG. 1. The BTS employs a Rake receiver to receive and demodulate a desired signal. It then determines a signal to noise ratio (SNR) of the received signal using SNR estimation. The BTS then compares the determined SNR to the nominal power level to generate a power control bit. Typically power control is only concerned with a single bit wherein a 1 indicates to the mobile unit to increase transmission power and a 0 indicates to the mobile unit to decrease transmission power. The power control bit is multiplexed with data and transmitted to the mobile unit as a Transmit Power Control (TPC). The mobile unit receives the TPC signal, demodulates it, and separates the PCB (demultiplexes it). The mobile unit then converts the PCB to a power transmission gain (positive or negative) of the output power in the Extract Power Control Bit and Convert to Power Step Size block. This is considered closed loop power control.

There are also methods in 3GPP considered outer loop power control. In outer loop power control systems, the BTS adjusts the nominal power level based upon a Frame Error Rate (FER) probability for a particular nominal power level. The BTS measures the FER probability and determines a SNR threshold. If at the output of the Viterbi decoder, the FER is high, the nominal power level is increased. If the FER is low, the nominal power level is decreased.

Channel fading without power control leads to a standard deviation of 5.5 dB for all fading frequencies. However, due to the deep fades of the desired signal, the standard deviation may decrease more than 20 dB with respect to the required signal level. This leads to the increase of the error probability for a particular mobile unit.

Based on the current 3GPP specification, closed loop power control results in a considerable reduction of SNR deviation for small fading frequencies (e.g. in the range of 8–15 Hz). However, the efficiency is greatly decreased when the fading frequency is above 30 Hz. This is because of the conventional fixed power control steps of 0.25 dB, 0.5 dB and/or 1 dB and the delay (at least one slot of power control bit command) which are not able to track the changes of the signal power in the channel in fast fading environments. For the same reasons large power overshooting (i.e. too many increases or decreases to the transmission power in the mobile unit) occurs at the BTS input for all fading frequencies.

Conventional 3GPP systems operate with a fixed power control step size (e.g. 1 dB) and a fixed power control command transmission delay. When a signal from a mobile unit experiences a deep fade, the BTS sends consecutive power increasing commands to the mobile unit. The mobile unit receives these commands and increases its transmission power to compensate for the deep fading. However the mobile unit continues to increase its power even after the deep fade period ends, due to the power control command transmission delay. This continued increase in power causes the power overshoot (see FIG. 2). Power overshooting negatively impacts the uplink power control performance by increasing the standard deviation of power control for the particular mobile unit and increasing the over all interference experienced by transmissions to the BTS. Power overshooting has been observed to be as high as 5 dB and has been known to occur at all fading frequencies.

Accordingly, there exists a need for a power control system which minimizes power overshoot.

There also exists a need for a power control system which maximizes uplink capacity.

There exists the need for a power control system which minimizes the standard deviation from the nominal power level.

Accordingly, it is an object of the present invention to provide a power control system which minimizes power overshoot.

It is another object of the invention to provide a power control system which minimizes the standard deviation from the nominal power level.

It is still another object of the invention to provide a power control system which employs a variable step size.

These and other objects of the invention will become apparent to those skilled in the art from the following description thereof.

SUMMARY OF THE INVENTION

In accordance with the teachings of the present invention, these and other objects may be accomplished by the present invention, which provides transmission power control of a mobile unit in a wireless communication system.

An embodiment of the invention includes a method of controlling the transmission power. The mobile unit receives a power control bits. Each of the power control bits is respectively received during a power control period. The mobile unit determines if each of the power control bits indicates that the transmission power should be increased. The mobile unit increases the transmission power by a predetermined amount each time it determines that one of the power control bits indicates that the transmission power should be increased. The mobile unit examines a block of power control bits to determine if a predetermined number of them indicates that the transmission power should be increased. The mobile unit determines that the predetermined number of power control bits indicates that the transmission power should be increased. The mobile unit examines a set of power control bits following the block of power control bits to determine if the set of power control bits indicates that the transmission power should be increased. After determining that the set indicates that the transmission power should be increased, the mobile unit increases the transmission power by an amount which exceeds the predetermined amount. The invention will next be described in connection with certain exemplary embodiments; however, it should be clear to those skilled in the art that various modifications, additions and subtractions can be made without departing from the spirit or scope of the claims.

Another embodiment of the invention includes a system for controlling transmission power of a mobile unit in a wireless communication system. The system includes a module for receiving power control bits during power control periods. At least some of the power control bits indicate that the transmission power should be increased. The system also includes a module for increasing the transmission power by a predetermined amount each time it receives a power control bits indicating that the transmission power should be increased. The system includes a module for examining a block of the power control bits. It also includes a module for determining that a predetermined number of the power control bits in the block indicate that the transmission power should be increased. The system includes a module for determining if a set of power control bits following the block of power control bits indicates that the transmission power should be increased. Further, the system includes a module for increasing the transmission power by an amount which exceeds the predetermined amount for each set of power control bits following the block of power control bits which indicates that the transmission power should be increased.

Yet another embodiment includes an apparatus for controlling transmission power of a mobile unit in a wireless communication system. The apparatus includes a receiver configured to receive transmit power control signals. It includes a demodulator in electrical communication with the receiver and a demultiplexor in electrical communication with the demodulator. The demultiplexor is configured to separate power control bits from the transmit power control signals. The apparatus further includes a power control bit analyzer in electrical communication with the demultiplexor and configured to determine if a predetermined number of the power control bits indicates a request to increase the transmission power.

BRIEF DESCRIPTION OF THE DRAWINGS

The invention will be more clearly understood by reference to the following detailed description of an exemplary embodiment in conjunction with the accompanying drawings, in which.

DETAILED DESCRIPTION OF THE INVENTION

Figure 1:
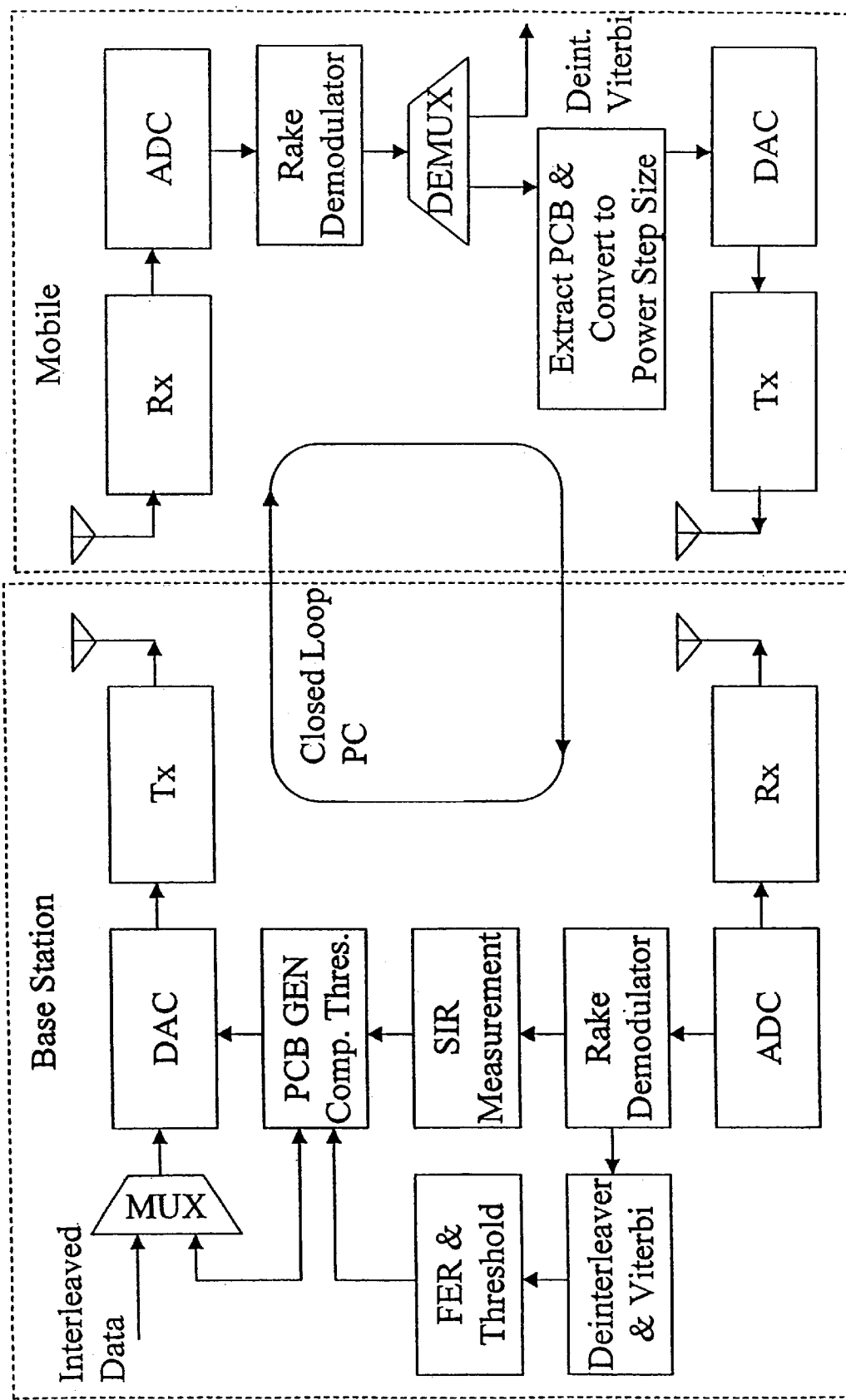
FIG. 1 illustrates a conventional closed loop power control system employed by 3GPP systems.
Figure 2:
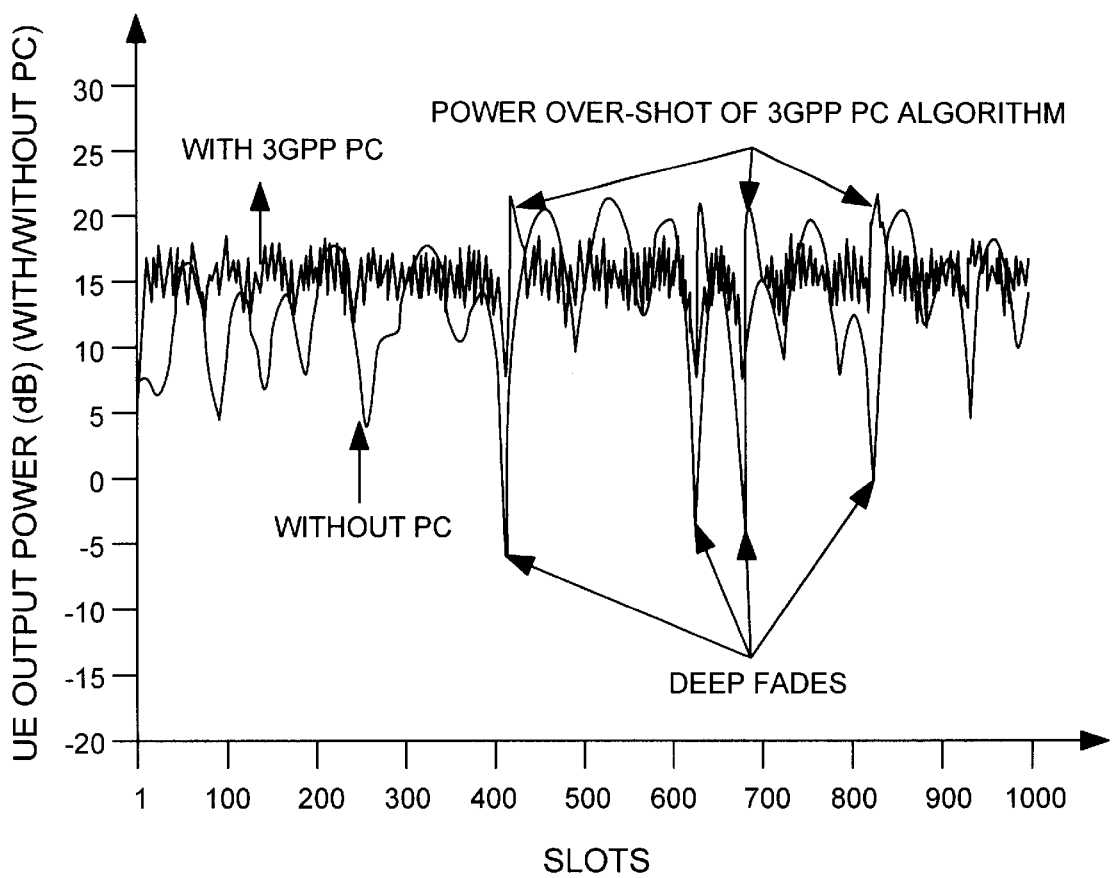
FIG. 2 illustrates deep fading and the resulting power overshoot in the 3GPP system according to FIG. 1.

The invention provides a system and method of power control in a CDMA communication system which minimizes power overshooting caused by deep fade compensation.

Conventional power control relies upon a one bit memoryless system. The present invention takes advantage of sequential power control bit patterns to provide better performance. In a preferred embodiment, the mobile unit will detect conventional power control bits and increase or decrease the transmission power by 1 dB per received bit. However, the present invention will also examine blocks of ten bits (e.g. the system will look for a block of ten ones @800 Hz (i.e. CDMA 2000) or twenty ones @1600 Hz (i.e. 3GPP), etc.) If at least eight of these ten bits are determined to be ones, then the system will assume that any zero bits in the block were received in error. For each consecutive one received after a block of ten ones, the mobile unit will increase the transmission power by 2 dB as illustrated in the following table (table 1).

TABLE 1

| | 1 | 2 | 3 | 4 | 5 | 6 | 7 | 8 | 9 | 10 | 11 | 12 |
|---|---|---|---|---|---|---|---|---|---|---|---|---|
| PCB | 1 | 1 | 1 | 1 | 1 | 1 | 1 | 1 | 1 | 1 | 1 | 1 |
| dB | +1 | +1 | +1 | +1 | +1 | +1 | +1 | +1 | +1 | +1 | +2 | +2 |

Thereafter, when the mobile unit receives a zero, it will increase the transmission power by 2 dB, then decrease the transmission power over the next two power control periods by 3 dB each period; regardless of the bits received during those periods. The following table (table 2) illustrates this aspect.

TABLE 2

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| PCB | 1 | 1 | 1 | 1 | 1 | 1 | 1 | 1 | 1 | 1 | 1 | 0 | ? | ? |
| dB | +1 | +1 | +1 | +1 | +1 | +1 | +1 | +1 | +1 | +1 | +2 | +2 | −3 | −3 |

While a particular embodiment of the invention has been described, the invention is not limited to this embodiment. Those skilled in the art will recognize that different block sizes can be examined and that the step size (change in power in dB) can be different than the step sizes provided. For example, instead of increasing the transmission power by 1 dB for the first ten PCB ones, the mobile unit could change the transmission power by 0.25 dB or 0.5 dB, etc. Instead of increasing by 2 dB upon receipt of the transition zero, the mobile unit could maintain the transmission power level then decrease the transmission power by 2 dB for each of the next two consecutive power control periods. The following table (table 3) illustrates this aspect of the invention.

TABLE 3

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| PCB | 1 | 1 | 1 | 1 | 1 | 1 | 1 | 1 | 1 | 1 | 1 | 0 | ? | ? |
| dB | +1 | +1 | +1 | +1 | +1 | +1 | +1 | +1 | +1 | +1 | +2 | 0 | −2 | −2 |

Further, the mobile could examine blocks of five bits and require all of the bits in the block to be 1's (or at least 3 or 4 of the bits to be ones, etc) to initiate the increased step size.

Those skilled in the art will recognize that the block size can be virtually any number of PCBs greater than 1. Then for every consecutive set of PCB ones thereafter (e.g. a set of 1 PCB one, 2 PCB ones, 3 PCB 1's, 4 PCB ones, etc.) the transmission power could be increased by 3 dB(or some other number larger than the standard increase for individual PCBs). Further the detection of the transition zero could be used to instruct the mobile unit to maintain the transmission power level, to decrease the power level or to increase it by 1 dB, 2 dB etc. Then the next two consecutive periods could be used to decrease the power level by 2 dB, 3 dB, etc. (e.g. some number greater than the standard increase for individual PCBs) The power drop in these two consecutive periods following the transition do not need to be the same. For example, the drop in the first period could be 3 dB while the drop in the next period is 2 dB, or the drop in the first period could be 2 dB while the drop in the second period is 3 dB, the drop in the first period could be 4 dB while the second dropped is 2 dB, etc. Table 4 provides an illustration of this type of configuration.

TABLE 4

|     | 1  | 2  | 3  | 4  | 5  | 6  | 7  | 8  | 9  | 10 | 11 | 12 | 13 | 14 |
|-----|----|----|----|----|----|----|----|----|----|----|----|----|----|----|
| PCB | 1  | 1  | 1  | 1  | 1  | 1  | 1  | 1  | 1  | 1  | 1  | 0  | ?  | ?  |
| dB  | +1 | +1 | +1 | +1 | +1 | +1 | +1 | +1 | +1 | +1 | +2 | +2 | −4 | −2 |

Figure 3:
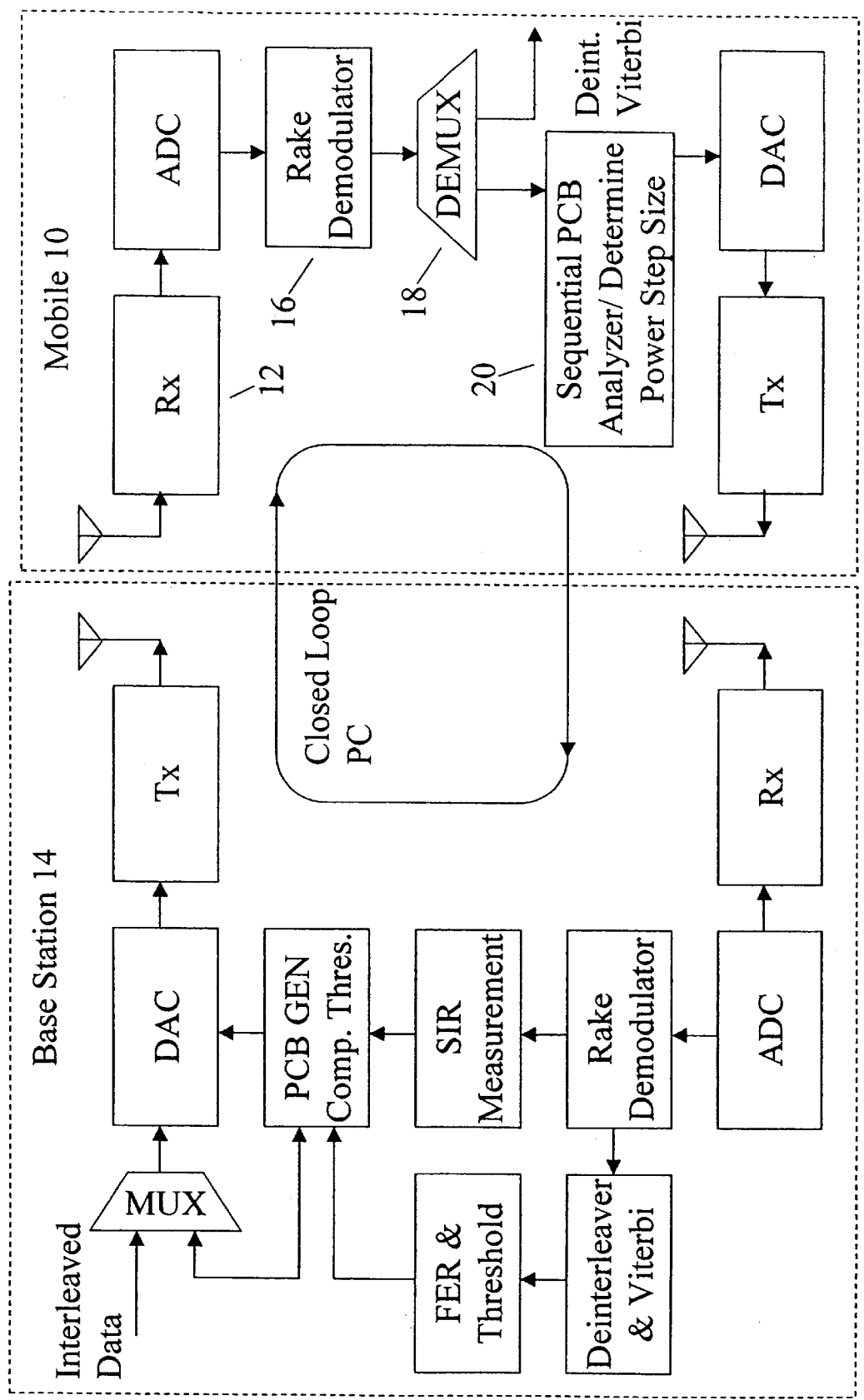
FIG. 3 illustrates a system in accordance with the present invention.

FIG. 3 illustrates an embodiment of the invention. In this embodiment, the mobile unit 10 includes a receiver 12 which receives a signal from the Base Station 14. The received signal is demodulated by the demodulator 16 then demultiplexed by demultiplexor 18 to separate the power control bits. The power control bits are then converted to a power step size which is determined in the manner described above by the PCB analyzer 20. One or more of the elements of FIG. 3 could be realized as the same or different microprocessors or as some other device such as an application-specific integrated circuit (ASIC), programmable logic array (PLA), or another suitable logic device. They can also be realized in software.

It will thus be seen that the invention efficiently attains the objects set forth above, among those made apparent from the preceding description. In particular, the invention provides methods and apparatus for analyzing power control bits and adjusting the transmission power of a mobile unit based thereon to minimize power overshoot. Those skilled in the art will appreciate that the configuration depicted in FIG. 3 provides such features.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A method of controlling transmission power of a mobile unit in a wireless communication system comprising:
    the mobile unit receiving a plurality of power control bits, wherein ones of said power control bits indicate that the transmission power should be increased, and wherein each of said plurality of power control bits is respectively received during a power control period;
    the mobile unit increasing the transmission power by a predetermined amount each time it receives one of said plurality of power control bits indicating that the transmission power should be increased;
    the mobile unit examining a block of said plurality of power control bits;
    the mobile unit determining that a predetermined number of said power control bits in said block indicate that the transmission power should be increased;
    the mobile unit determining if a set of power control bits following said block of power control bits indicates that the transmission power should be increased;
    the mobile unit increasing the transmission power by an amount which exceeds said predetermined amount for each set of power control bits following said block of power control bits which indicates that the transmission power should be increased.

2. A method of controlling transmission power of a mobile unit according to claim 1 wherein said set of power control bits comprises one power control bit.

3. A method of controlling transmission power of a mobile unit according to claim 1 wherein said set of power control bits comprises a plurality of power control bits.

4. A method of controlling transmission power of a mobile unit according to claim 1 further comprising:
    the mobile unit determining if a set of power control bits following said block of power control bits indicates that the transmission power should be decreased;
    the mobile unit increasing the transmission power by an amount which exceeds said predetermined amount when said mobile unit determines that a set of power control bits following said block of power control bits indicates that the transmission power should be decreased; then said mobile unit decreasing the transmission power by another amount which exceeds said predetermined amount during each of two consecutive power control periods following said set of power control bits which indicates that the transmission power should be decreased.

5. A method of controlling transmission power of a mobile unit according to claim 1 further comprising the mobile unit increasing the transmission power by an amount which exceeds said predetermined amount when the mobile unit determines that said predetermined number of power control bits indicates that the transmission power should be increased.

6. A method of controlling transmission power of a mobile unit according to claim 1 wherein said block comprises 10 bits.

7. A method of controlling transmission power of a mobile unit according to claim 1 wherein said block comprises 5 bits.

8. A method of controlling transmission power of a mobile unit according to claim 1 further comprising:
    the mobile unit determining that if a set of power control bits following said block of power control bits indicates that the transmission power should be decreased;
    the mobile unit maintaining a transmission power when said mobile unit determines that a set of power control bits following said block of power control bits indicates that the transmission power should be decreased; then said mobile unit decreasing the transmission power by an amount which exceeds said predetermined amount during each of two consecutive power control periods.

9. A system for controlling transmission power of a mobile unit in a wireless communication system comprising:

means for receiving a plurality of power control bits, wherein ones of said power control bits indicate that the transmission power should be increased, and wherein each of said plurality of power control bits is respectively received during a power control period;

means for increasing the transmission power by a predetermined amount each time said means for increasing receives one of said plurality of power control bits indicating that the transmission power should be increased;

means for examining a block of said plurality of power control bits;

means for determining that a predetermined number of said power control bits in said block indicate that the transmission power should be increased;

means for determining if a set of power control bits following said block of power control bits indicates that the transmission power should be increased; and, means for increasing the transmission power by an amount which exceeds said predetermined amount for each set of power control bits following said block of power control bits which indicates that the transmission power should be increased.

10. A system for controlling transmission power of a mobile unit according to claim 9 further comprising:

means for determining if a set of power control bits following said block of power control bits indicates that the transmission power should be decreased;

means for increasing the transmission power by an amount which exceeds said predetermined amount when said mobile unit determines that a set of power control bits following said block of power control bits indicates that the transmission power should be decreased; and, means for decreasing the transmission power by another amount which exceeds said predetermined amount during each of two consecutive power control periods following said set of power control bits which indicates that the transmission power should be decreased.

11. An apparatus for controlling transmission power of a mobile unit in a wireless communication system, said apparatus comprising:

a receiver configured to receive transmit power control signals;

a demodulator coupled to said receiver;

a demultiplexor coupled to said demodulator, configured to separate a plurality of power control bits from said transmit power control signals;

a power control bit analyzer coupled to said demultiplexor; configured to determine if a predetermined number of said plurality of power control bits indicates a request to increase the transmission power;

a processor coupled to said control bit analyzer;

wherein said processor is configured to increase the power by a predetermined amount for ones of said plurality of power control bits which indicate a request to increase the transmission power; and, wherein said processor is configured to increase the power by an amount which exceeds said predetermined amount if said predetermined number of said plurality of power control bits indicates a request to increase the transmission power.

12. An apparatus for controlling transmission power of a mobile unit in a wireless communication system, said apparatus comprising:

a receiver configured to receive transmit power control signals;

a demodulator coupled to said receiver;

a demultiplexor coupled to said demodulator, configured to separate a plurality of power control bits from said transmit power control signals;

a power control bit analyzer coupled to said demultiplexor; configured to determine if a predetermined number of said plurality of power control bits indicates a request to increase the transmission power;

a processor coupled to said power control bit analyzer, wherein said processor is configured to increase the power by a predetermined amount for ones of said plurality of power control bits which indicate a request to increase the transmission power; and, wherein said processor is configured to increase the power by an amount which exceeds said predetermined amount if said predetermined number of said plurality of power control bits indicates a request to increase the transmission power and a set of bits following said predetermined number of said plurality of bits indicates a request to increase the transmission power.

13. An apparatus according to claim 12 wherein:

said processor is configured to increase the transmission power by an amount which exceeds said predetermined amount if said predetermined number of said plurality of power control bits indicates a request to increase the transmission power and a set of bits following said predetermined number of said plurality of bits indicates a request to decrease the transmission power.

14. An apparatus according to claim 13 wherein:

said processor is configured to decrease the transmission power by said amount which exceeds said predetermined amount for a plurality of power control periods following receipt of said set of bits.

15. An apparatus according to claim 13 wherein:

said processor is configured to decrease the transmission power by another amount which exceeds said predetermined amount for a plurality of power control periods following receipt of said set of bits.

16. An apparatus according to claim 12 wherein:

said processor is configured to maintain the transmission power if said predetermined number of said plurality of power control bits indicates a request to increase the transmission power and a set of bits following said predetermined number of said plurality of bits indicates a request to decrease the transmission power.

17. An apparatus according to claim 16 wherein:

said processor is configured to decrease the transmission power by an amount which exceeds said predetermined amount for a plurality of power control periods following receipt of said set of bits.

* * * * *